United States Patent
Kuwabara et al.

(10) Patent No.: US 8,832,998 B2
(45) Date of Patent: Sep. 16, 2014

(54) SEALING MECHANISM OF AUTOMOBILE DOOR

(71) Applicants: Nishikawa Rubber Co., Ltd., Hiroshima (JP); Tesla Motors, Inc., Palo Alto, CA (US)

(72) Inventors: Hirokazu Kuwabara, Hiroshima (JP); Matthew Richard Partsch, Livonia, MI (US)

(73) Assignees: Nishikawa Rubber Co., Ltd., Hiroshima (JP); Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/720,166

(22) Filed: Dec. 19, 2012

(65) Prior Publication Data

US 2013/0160376 A1 Jun. 27, 2013

(30) Foreign Application Priority Data

Dec. 22, 2011 (JP) ................. 2011-282150

(51) Int. Cl.
*E06B 7/16* (2006.01)
*E06B 7/23* (2006.01)

(52) U.S. Cl.
CPC .................... *E06B 7/2309* (2013.01)
USPC .......................... 49/489.1; 49/440

(58) Field of Classification Search
USPC ........... 49/440, 441, 502, 475.1, 489.1, 492.1
See application file for complete search history.

(56) References Cited

U.S. PATENT DOCUMENTS

| | | | |
|---|---|---|---|
| 5,535,571 A * | 7/1996 | Nichols | 52/716.6 |
| 6,571,513 B2 * | 6/2003 | Maass | 49/489.1 |
| 6,792,718 B2 * | 9/2004 | Nozaki | 49/441 |
| 7,762,614 B2 * | 7/2010 | Kubo et al. | 296/146.2 |
| 2001/0034976 A1 * | 11/2001 | Maass | 49/441 |
| 2002/0184826 A1 * | 12/2002 | Nozaki | 49/441 |
| 2004/0227987 A1 * | 11/2004 | Holliday et al. | 359/350 |
| 2006/0209397 A1 * | 9/2006 | Holliday et al. | 359/350 |
| 2008/0172948 A1 * | 7/2008 | Shibata et al. | 49/440 |

FOREIGN PATENT DOCUMENTS

JP 03-005625 U 1/1991

* cited by examiner

*Primary Examiner* — Katherine Mitchell
*Assistant Examiner* — Scott Denion
(74) *Attorney, Agent, or Firm* — Alston & Bird LLP

(57) ABSTRACT

A sealing mechanism of an automobile door including a sliding window pane configured to be raised or lowered to/from the door window part and a side panel, includes: a retainer fixed to the side panel; and a glass run held by the retainer. The glass run includes a hollow seal part, and the base of the seal part has a slit. A pair of engagement parts of the retainer is engaged with both sides of the base of the seal part. A ridge located between the engagement parts of the retainer is fitted in the slit of the base.

11 Claims, 8 Drawing Sheets

Prior Art

Prior Art

_US 8,832,998 B2_

SEALING MECHANISM OF AUTOMOBILE DOOR

CROSS-REFERENCE TO RELATED APPLICATION

This application claims priority to Japanese Patent Application No. 2011-282150 filed on Dec. 22, 2011, the disclosure of which including the specification, the drawings, and the claims is hereby incorporated by reference in its entirety.

BACKGROUND

The present disclosure relates to sealing mechanisms of automobile doors.

In a front door of an automobile illustrated in FIG. 1, a fixed pane is provided as a side panel 2 at the front of an up-and-down sliding window pane (hereinafter referred to as a sliding window pane) 1. Such a side panel 2 is used as a mirror base in some cases, and also called a corner bracket. Although not shown, in a rear door, a side panel is also provided at the rear of a sliding window pane in some cases. The side panel is not necessarily made of glass, and can be made of a metal or a resin.

A retainer 5 is fixed to the front door so as to hold the sliding window pane 1 while allowing the sliding window pane 1 to move up and down, and seal the clearance between the sliding window pane 1 and the side panel 2. A glass run is attached to the retainer 5. The retainer 5 and the glass run extend from below a belt line L of the door across the belt line L to reach the proximity of a front pillar.

FIG. 2 illustrates an example of a glass run 4. A first part 4a located at the upper end of the glass run 4 has a contact part 6 which comes in elastic contact with a weatherstrip on a front pillar when the door is opened or closed. A second part 4b continuous to the first part 4a has a hollow shape as illustrated in FIG. 3, for example, so as to seal the clearance between the sliding window pane 1 and the side panel 2. A third part 4c has an engagement part 7 to be engaged with a retainer 3. A fourth part 4d has an approximate U shape in cross section as illustrated in FIG. 4, for example, so as to hold the sliding window pane 1 while allowing the sliding window pane 1 to move up and down.

In this manner, since the parts of the glass run 4 have different shapes, formation of the glass run 4 employs an insert molding process in which previously molded parts are placed in a mold and then these parts are joined together, for example. In this process, the second part 4b and the fourth part 4d are prepared by extrusion molding, and are placed in a mold, and then, the first part 4a and the third part 4c are molded by injection or transfer. In this manner, the glass run 4 made of the integrated first through fourth parts 4a-4d is obtained.

In addition, a conventional technique of molding the first through third parts 4a-4c including the second part 4b at a time has also been studied. In this technique, since the second part 4b has a hollow shape, a core material (i.e., a core) is needed, and a slit for drawing out the core material needs to be provided in the second part 4b along the entire length thereof. However, if the slit for drawing out the core material in the second part 4b remains open, the retainer cannot stably hold the glass run, and the door glass panel is poorly sealed. As a solution to these problems, the slit for drawing out the core material is filled with an adhesive. In this case, however, when a load is applied to the adhesive, the adhesion might be broken. In addition, the adhesive might deteriorate with time. Thus, this solution is not effective.

In view of this, Japanese Utility Model Publication No. H03-5625 shows the following technique. In this technique, a hollow pad is inserted in a hollow weatherstrip having a longitudinally extending slit through the slit, and the slit is filled with an adhesive. In addition, if the slit is wide, the base of the hollow pad is fitted in the slit. Although not clearly described in this publication, the slit of this publication is supposed to be a slit for drawing out a core material described above.

According to the description of Japanese Utility Model Publication No. H03-5625, the rigidity of a glass run can be enhanced by the hollow pad. Thus, even in a case where an adhesive is applied to the slit, the adhesion is less likely to be broken. In addition, in a case where the base of the hollow pad is fitted in the slit, the glass run is expected to be more firmly held by a retainer because of the fitting of the hollow pad. However, there arises a problem of the necessity of another pad in order to prevent degradation of the glass-run holding ability by the slit and the sealing ability.

SUMMARY

To solve the problems described above, according to the present disclosure, in a case where a longitudinally extending slit is provided in a hollow seal part of a glass run, the glass run can be stably held by a retainer, and the sealing ability is ensured, without using a pad as described above.

According to the present disclosure, a slit in a glass run is filled by utilizing a retainer.

Specifically, an example sealing mechanism of an automobile door including a sliding window pane configured to be raised or lowered to/from a door window part and a side panel fixed to a door window part, the sealing mechanism includes:
  a retainer fixed to the side panel; and
  a glass run held by the retainer, wherein
  the glass run includes a hollow seal part including a contact part to be in contact with an interior side of the sliding window pane and a base provided at a back of the contact part,
  the base of the hollow seal part has a slit extending along a longitudinal direction of the glass run,
  the retainer includes a retainer body extending along a back of the base, a pair of engagement parts provided in the retainer body and engaged with both sides of the base, and a ridge projecting toward an exterior relative to the retainer body, located between the engagement parts and configured to be fitted in the slit of the base,
  the pair of engagement parts engaged with both sides of the base and the ridge fitted in the slit allow the retainer to hold the base, and
  the glass run and the ridge of the retainer constitute a hollow portion in a closed cross section extending along a longitudinal direction of the glass run.

Preferably, the glass run is an integrated unit of a glass-run upper part extending upward from a position lower than a belt line of the door and a glass-run lower part extending downward from the position lower than the belt line,
  the glass-run upper part includes the hollow seal part including the base having the slit,
  the glass-run lower part has a channel shape,
  the ridge of the retainer is provided at least in the glass-run upper part, and
  in the glass-run upper part, the ridge of the retainer is fitted in the slit of the base, Preferably, the ridge of the retainer continuously extends from the glass-run upper part to the glass-run lower part,
  in the glass-run upper part, the ridge of the retainer is fitted in the slit of the base, and in the glass-run lower part, a tip surface of the ridge of the retainer is in contact with an interior surface of the glass-run lower part.

Preferably, a center of the base of the glass-run upper part protrudes toward an interior relative to an interior surface of the glass-run lower part to form a protruding portion, and the slit in which the ridge is fitted is provided in the protruding portion of the base.

Preferably, the ridge of the retainer has an approximate T shape in cross section including a leg projecting toward the exterior relative to the retainer body and a jutting-out portion supported by the leg and jutting out from both sides of the ridge, and both side rims of the jutting-out portion are fitted in the slit of the base.

According to the present disclosure, the pair of engagement parts of the retainer is engaged with both sides of the base of the hollow seal part, and the ridge between the engagement parts of the retainer is fitted in the slit of the base. Accordingly, the ridge not only simply fills the slit but also holds the base together with the engagement parts at both sides thereof. Specifically, the base is held at two positions by the ridge and the pair of engagement parts. Accordingly, even if the slit is wide, and in addition, even if the slit is formed along a large part of the length of the hollow seal part, holding of the glass run by the retainer can be ensured, thereby obtaining stable holding. In addition, since the ridge of the retainer forms a hollow portion in a closed cross section together with the glass run, the sealing ability between the sliding window pane and the side panel can be enhanced.

In molding the glass run, a core material for forming a hollow portion of the hollow seal part is drawn out from the slit. In this process, the slit can be made wide along a large part of the length of the hollow seal part without impairing the glass-run holding ability of the retainer and the sealing ability as described above. As a result, the core material can be easily drawn out.

In a case where the glass-run upper part includes the hollow seal part having the slit, the glass-run lower part has a channel shape, the ridge of the retainer continuously extends from the glass-run upper part to the glass-run lower part, the ridge is fitted in the slit in the glass-run upper part, and the tip surface of the ridge is in contact with the interior surface of the glass-run lower part in the glass-run lower part, the ridge of the retainer has a support function of holding the channel shape in the glass-run lower part. As a result, the ridge continuously extending from the upper portion to the lower portion of the retainer can be effectively utilized.

Specifically, in a case where the retainer is formed by extrusion molding, the ridge is formed along the entire length of the retainer. Thus, the ridge is fitted in the slit of the glass-run upper part in the upper portion of the retainer to achieve stable holding of the glass run and an enhanced sealing ability, whereas the ridge is in contact with the glass-run lower part in the lower portion of the retainer to achieve the function of supporting the glass-run lower part.

In a case where the center of the base of the glass-run upper part protrudes toward the interior relative to the interior surface of the glass-run lower part to form a protruding portion, and the slit is formed in this protruding portion such that the ridge is fitted in the slit, even if the projection height of the ridge is made uniform along the entire length due to extrusion molding of the retainer, the ridge is fitted in the slit in the upper portion of the retainer, whereas the ridge is in contact with the interior surface of the glass-run lower part in the lower portion of the retainer. In addition, since the slit is formed in the portion of the base protruding toward the interior, the slit can be easily fitted in the slit.

In a case where the ridge of the retainer has an approximate T shape in cross section including the leg projecting toward the exterior relative to the retainer body and the jutting-out portion supported by the leg and jutting out from both sides of the ridge, and both side rims of the jutting-out portion are fitted in the slit of the base, the leg is narrower than the jutting-out portion. Accordingly, the weight of the retainer can be more advantageously reduced, as compared to a ridge projecting from the base to a width corresponding to that of the slit. Moreover, since the jutting-out portion of the ridge is separated from the retainer body, a margin can be obtained between the base and the retainer booty. Accordingly, even when a dimensional error occurs between the retainer and the glass run, the jutting-out portion can be easily fitted in the slit of the base.

DETAILED DESCRIPTION

An embodiment of the present disclosure will be described hereinafter with reference to the drawings. The following embodiment is merely a preferred example in nature, and is not intended to limit the scope, applications, and use of the invention.

Figure 5:
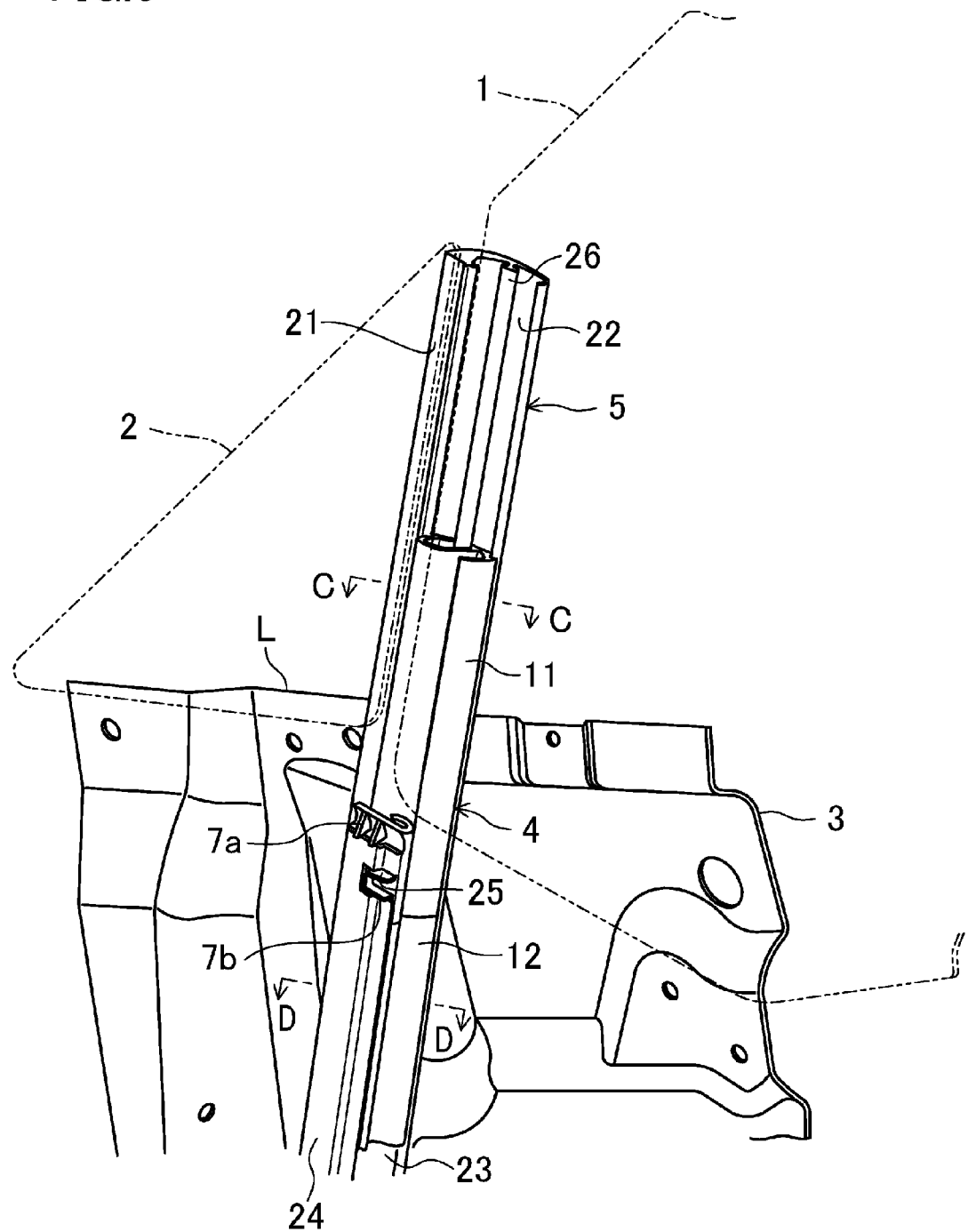
FIG. 5 is a perspective view illustrating a door structure of an automobile according to the present disclosure.

FIG. 5 illustrates a structure of a front door of an automobile according to an embodiment. In FIG. 5, reference character 1 denotes a sliding window pane, reference character 2 denotes a fixed side panel located at the front of the sliding window pane 1, and reference character 3 denotes a door inner panel. To raise and lower the sliding window pane 1, a glass run 4 made of an elastic material located at the front of the sliding window pane 1 (i.e., toward the side panel 2) and a retainer 5 made of a metal or a resin and holding the glass run 4 are provided. FIG. 5 is a view of a front part of the door when viewed from the exterior with a door outer panel omitted.

<Glass Run>

Figure 1:
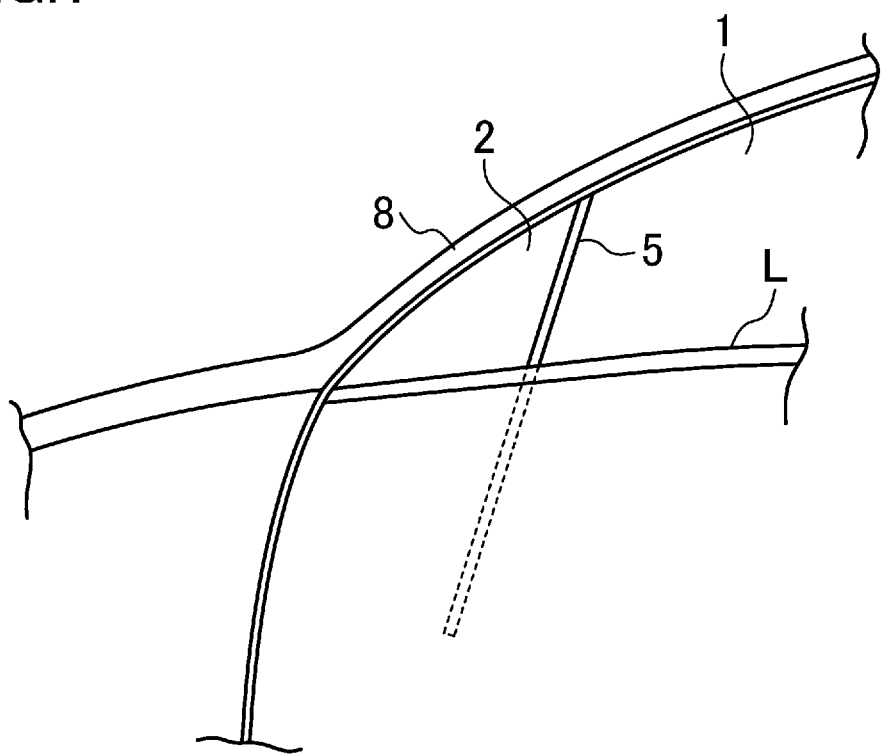
FIG. 1 is a side view illustrating an automobile door.

The glass run 4 is an integrated unit made of a glass-run upper part 11 formed by molding and a glass-run lower part 12 formed by extrusion molding. The glass-run upper part 11 extends upward from a position lower than a door belt line (i.e., the upper edge of a door inner panel 3) L across the belt line L. In FIG. 5, although the glass-run upper part 11 is shown to be cut away at a halfway position, the upper end of the glass-run upper part 11 reaches a front pillar 8 shown in FIG. 1. The glass-run lower part 12 extends from the lower end of the glass-run upper part 11 to a portion near the lower end of the sliding window pane 1 when the sliding window pane 1 is moved to the bottom.

Figure 2:
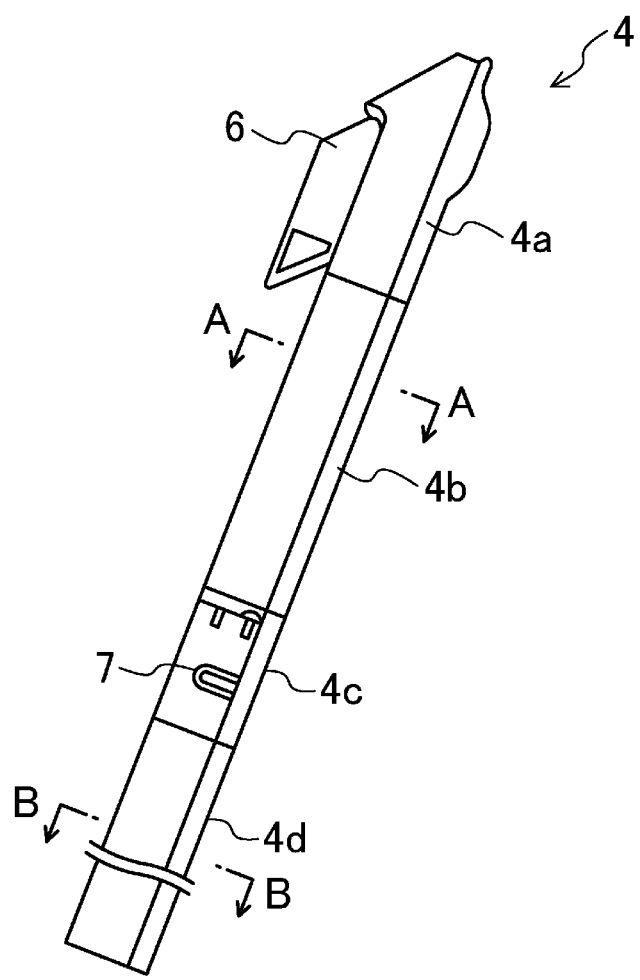
FIG. 2 is a partially omitted front view illustrating a conventional glass run.
Figure 3:
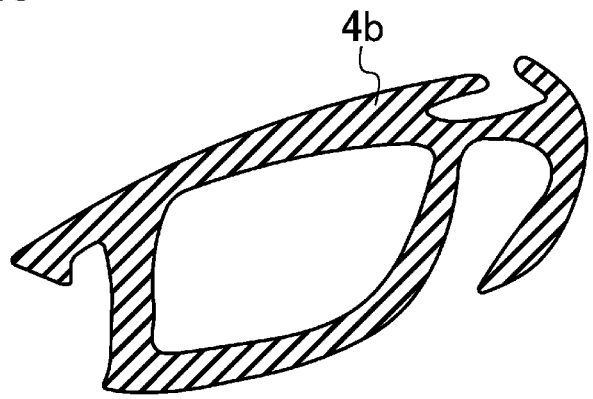
FIG. 3 is a cross-sectional view taken along line A-A in FIG. 2.
Figure 4:
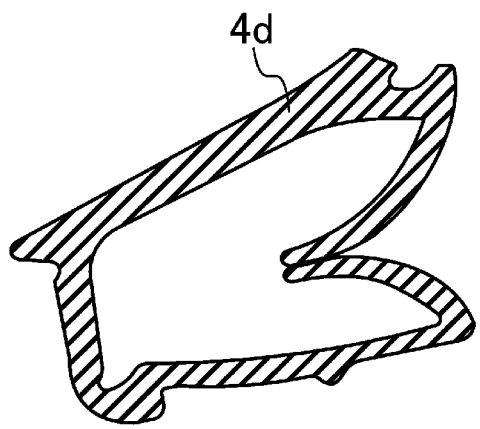
FIG. 4 is a cross-sectional view taken along line B-B in FIG. 2.
Figure 6:
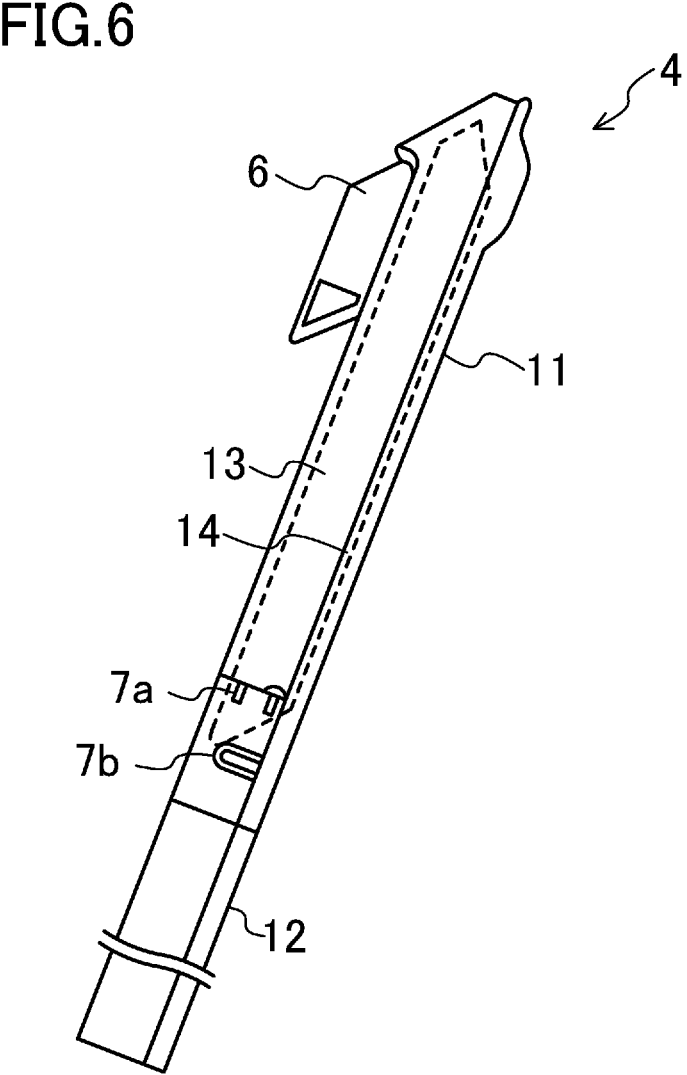
FIG. 6 is a partially omitted front view illustrating a glass run according to the present disclosure.

As illustrated in FIG. 6, the glass-run upper part 11 includes a contact part 6 which comes in elastic contact with, and seals, a weatherstrip of a front pillar in closing the door and is located at the upper end of the glass-run upper part 11. The glass-run upper part 11 also includes engagement parts 7a and 7b located at the lower end of the glass-run upper part 11 and configured to be engaged with the retainer 5. Specifically, as compared to the above glass run 4 illustrated in FIG. 2, the glass-run upper part 11 of this embodiment includes first through third parts 4a-4c which are formed by molding. The glass-run lower part 12 corresponds to the fourth part 4d of the glass run 4 illustrated in FIG. 2.

Figure 7:
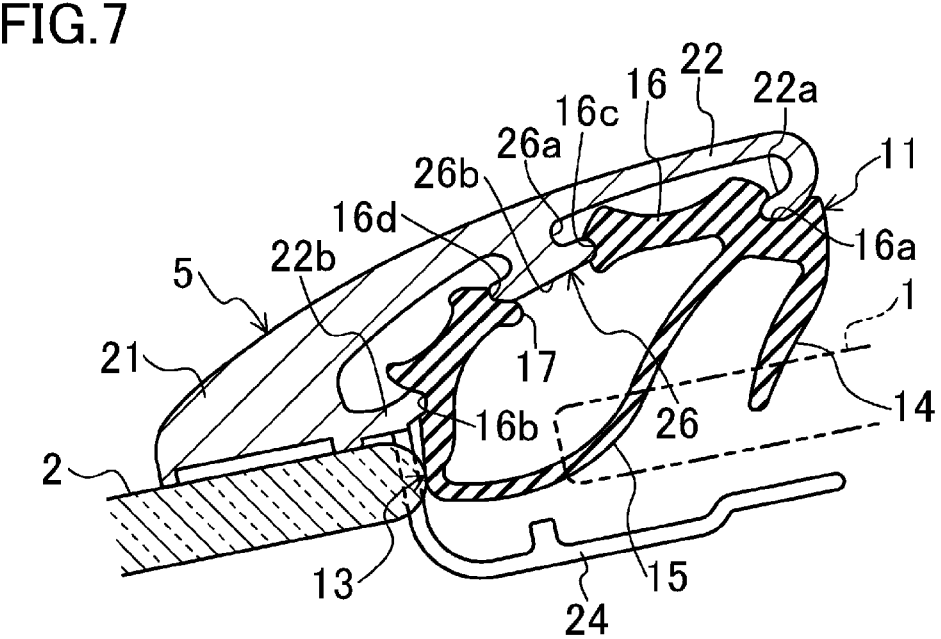
FIG. 7 is a cross-sectional view taken along line C-C in FIG. 5.

As illustrated in FIG. 7 (a cross-sectional view taken along line C-C in FIG. 5), the glass-run upper part 11 seals only the interior side of the clearance between the sliding window pane 1 and the side panel 2. To obtain this structure, the glass-run upper part 11 includes a hollow seal part 13 and a sealing lip 14 to be in contact with the interior side of the sliding window pane 1. The hollow seal part 13 includes a contact part 15 to be in contact with the sliding window pane and a base 16 located at the back of the contact part 15 and extending substantially in the front-to-rear direction. The sealing lip 14 is bent toward the exterior at the side rim of the base 16 facing to the rear of the automobile (i.e., facing the sliding window pane 1). When the sliding window pane 1 is raised or lowered, the side rim of the sliding window pane 1 toward the side panel 2 comes in slidable contact with the seal part 13, and the interior surface of the sliding window pane 1 near the side rim comes in slidable contact with the sealing lip 14.

To allow the retainer 5 to hold the glass-run upper part 11, engagement grooves 16a and 16b extending along the longitudinal direction of the glass run are formed at both sides of the base 16, and a slit 17 extending along the longitudinal direction of the glass run is formed in the middle of the base 1. Engagement grooves 16c and 16d extending along the longitudinal direction of the glass run are formed in the surfaces of the base 16 which face each other with the slit 17 sandwiched therebetween.

Figure 8:
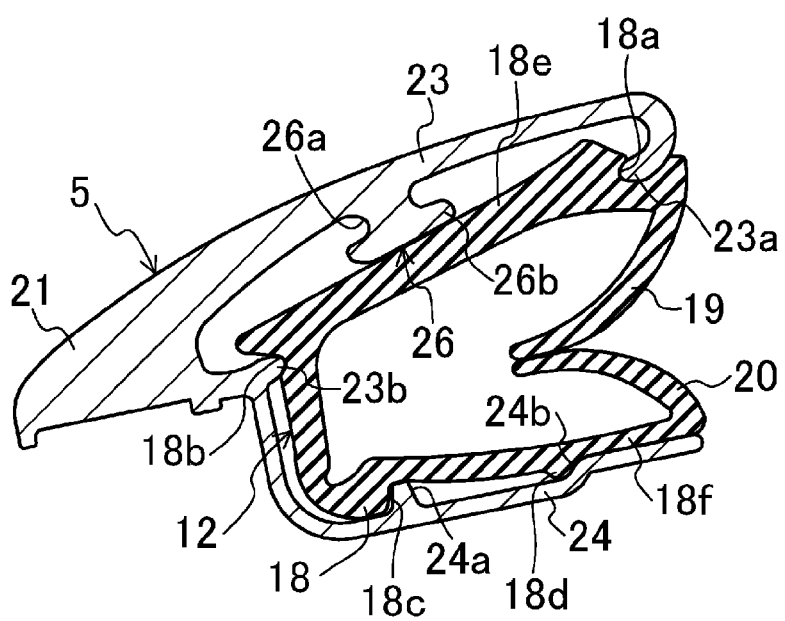
FIG. 8 is a cross-sectional view taken along line D-D in FIG. 5.

As illustrated in FIG. 8 (a cross-sectional view taken along line D-D in FIG. 5), the glass-run lower part 12 sandwiches of the side rim of the sliding window pane 1 at the interior and exterior sides of the sliding window pane 1 to guide the raising and lowering of the sliding window pane 1. To obtain this function, the glass-run lower part 12 includes a base 18 which has a channel shape and is open to the sliding window pane 1, and lips 19 and 20 extending from the interior and exterior rims of the opening of the base 18 and each bent inward. The sliding window pane 1 is raised or lowered with the interior and exterior surfaces of the side rim thereof being in slidable contact with the lips 19 and 20.

To allow the retainer 5 to hold the glass-run lower part 12, engagement grooves 18a and 18b extending along the longitudinal direction of the glass run are formed at both sides of the interior surface of the base 18, and a step 18c and a projection 18d extending along the longitudinal direction of the glass run are provided on the exterior surface of the base 18.

<Retainer 5>

As illustrated in FIG. 5, the retainer 5 extends from a position near the upper end of the side panel 2 to a position near the lower end of the sliding window pane 1 when the sliding window pane 1 is moved to the bottom, in association with the glass run 4. A fixed part 21 to be fixed to the side panel 2 and the door inner panel 3 is provided on a side (a side toward the side panel 2) of the retainer 5 along the entire length in the longitudinal direction of the retainer.

To hold the glass run, only an inner part (a retainer body) 22 holding the interior side of the glass-run upper part 11 is provided above the retainer 5 (i.e., above the engagement part 7a of the glass-run upper part 11). As illustrated in FIG. 7, the inner part 22 extends substantially in the front-to-rear direction along the base 16 of the glass-run upper part 11, and engagement parts 22a and 22b extending along the longitudinal direction of the retainer are provided at both side rims of the inner part 22 to be engaged with both sides of the base 16. The engagement parts 22a and 22b project to face each other at the both side rims of the inner part 22, and are respectively engaged with the engagement grooves 16a and 16b at both sides of the base 16.

As illustrated in FIG. 5, to hold the glass-run, an inner part (a retainer body) 23 which is continuous to the inner part 22 at the top of the retainer 5, extends downward, and holds the interior side of the glass-run lower part 12, and an outer part 24 holding the exterior side of the glass-run lower part 12 are provided in the lower portion of the retainer 5. As illustrated in FIG. 8, the inner part 23 and the outer part 24 constitute a glass-run holding part which has a channel shape and is open to the sliding window pane 1.

The inner part 23 in the lower portion of the retainer 5 has the same shape in cross section as that of the inner part 22 in the upper portion of the retainer 5. Specifically, the inner part 23 extends substantially in the front-to-rear direction along a side wall 18e at the interior side of the base 18 of the glass-run lower part 12, and engagement parts 23a and 23b extending along the longitudinal direction of the retainer are provided at both side rims of the inner part 23 to be engaged with both sides of the base 18. The engagement parts 23a and 23b project to face each other at the both side rims of the inner part 23, and are respectively engaged with engagement grooves 18a and 18b at both sides of the base 18.

The outer part 24 in the lower portion of the retainer 5 extends substantially in the front-to-rear direction along a side wall 18f at the exterior side of the base 18, and includes a projection 24a to be engaged with the step 18c of the base 18 and a step 24b to be engaged with the projection 18d of the base 18. The projection 24a and the step 24b extend along the longitudinal direction of the retainer.

<Ridge of Retainer 5>

Figure 9:
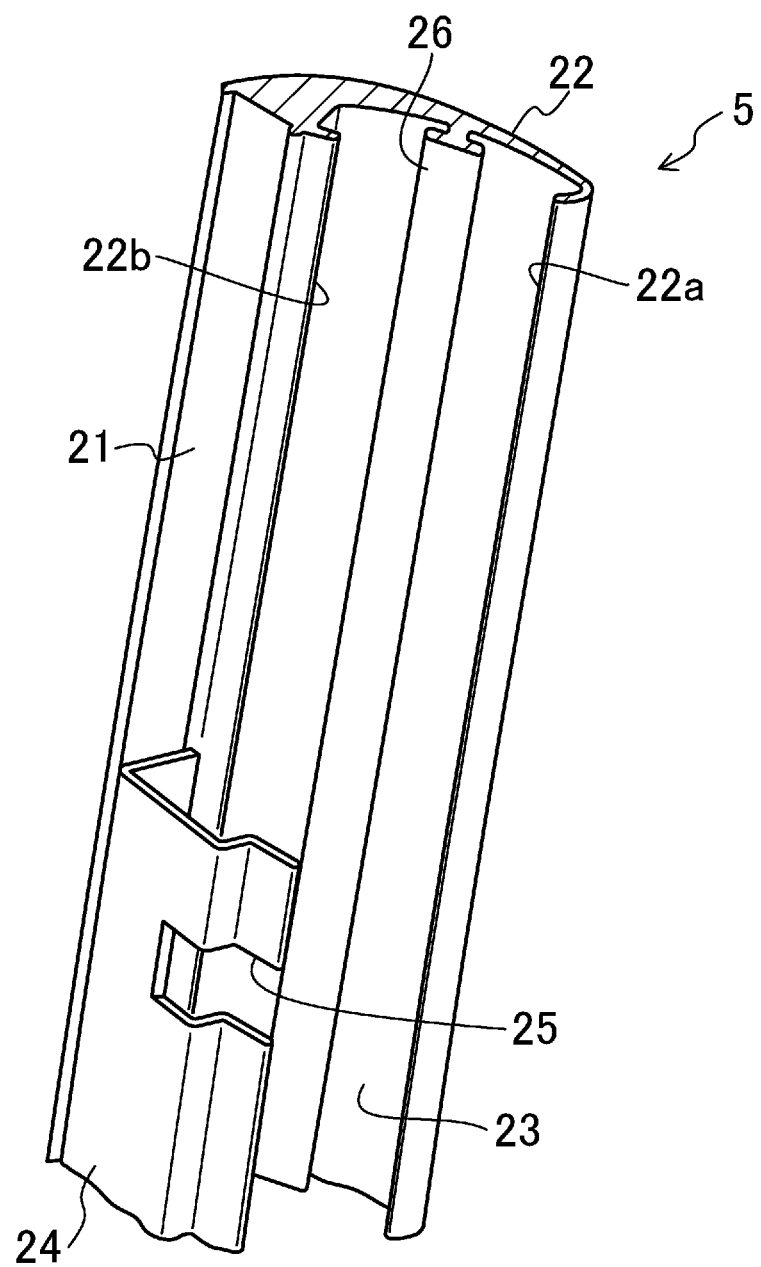
FIG. 9 is a perspective view illustrating part of a retainer according to the present disclosure.

As illustrated in FIGS. 5 and 9, the retainer 5 has a ridge 26 continuously extending in the longitudinal direction of the retainer along the entire length thereof and located between the engagement parts 22a and 22b of the inner part 22 in the upper portion of the retainer 5 and between the engagement parts 23a and 23b of the inner part 23 in the lower portion of the retainer 5. The engagement part 22a is continuous to the engagement part 23a, and the engagement part 22b is also continuous to the engagement part 23b. As illustrated in FIGS. 7 and 8, the ridge 26 has an approximate T shape in cross section including a leg 26a projecting to the exterior and a jutting-out portion 26b supported by the leg 26a and jutting out from both sides of the ridge 26 The projection height of the ridge 26 is uniform along the entire length thereof.

As illustrated in FIG. 7, in the glass-run upper part 11, the jutting-out portion 26b of the ridge 26 is fitted in the slit 17 of the base 16. Specifically, both side rims of the jutting-out portion 26b are engaged with the engagement grooves 16c and 16d which face each other with the slit 17 of the base 16 interposed therebetween. As illustrated in FIG. 8, in the glass-run lower part 12, the tip surface of the ridge 26, i.e., the surface of the jutting-out portion 26b toward the exterior, is in contact with the side wall 18e at the interior side of the channel-shaped base 18.

Figure 10:
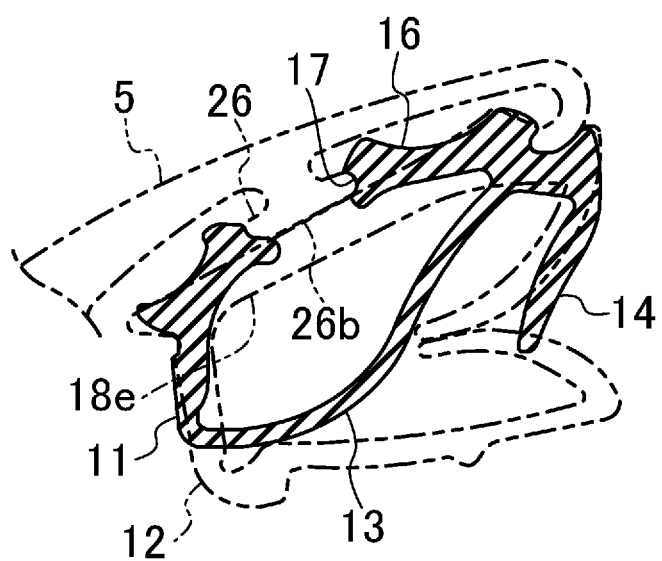
FIG. 10 is a cross-sectional view showing a relationship between an upper part and a lower part (a protruding state of a base) of a glass run according to the present disclosure.

The base 16 of the glass-run upper part 11 is not flat, and as illustrated in FIG. 10, the center of the base 16 protrudes toward the interior relative to the side wall 18e at the interior side of the base 8 of the glass-run lower part 12, and the slit 17 is formed in this protruding portion. Accordingly, although the height of the ridge 26 of the retainer 5 is uniform along the entire length of the retainer, the jutting-out portion 26b is fitted in the slit 17 of the base 16 in the glass-run upper part 11, and is in contact with the side wall 18e at the interior side of the base 18 in the glass-run lower part 12.

<Positioning of Glass Run 4 and Retainer 5>

As illustrated in FIG. 9, a recess 25 which is open toward the sliding window pane 1 is formed in the upper end of the outer part 24 at the bottom of the retainer 5. As illustrated in FIG. 5, the engagement part 7a of the glass-run upper part 11 is engaged with the upper end of the outer part 24, and the engagement part 7b is fitted in the recess 25 of the outer part 24. The engagement between the engagement part 7a and the outer part 24 and the fitting of the engagement part 7b in the recess 25 can provide relative positioning between the glass run 4 and the retainer 5.

<Formation of Glass Run 4>

The glass run 4 can be obtained by insert molding. Specifically, a glass-run lower part 12 which has been extrusion molded beforehand and a core material for forming a hollow portion of a hollow seal part 13 are placed in a mold for forming a glass-run upper part 11. Then, the mold is filled with a molding material, thereby molding a glass-run lower part 11. After the molding, the core material is dawn out from the slit 17 of the glass-run upper part 11. In this manner, a glass run 4 as an integrated unit of the glass-run upper part 11 and the glass-run lower part 12 can be obtained. The glass run 4 may be made of a rubber or a resin (including thermoplastic elastomer: TPE), or a complex of a rubber and a resin (e.g., the glass-run lower part 12 is made of a rubber and the glass-run upper part 11 is made of a resin).

Advantages of Embodiment

In the glass-run upper part 11 of the above embodiment, the pair of engagement parts 22a and 22b of the retainer 5 is engaged with the engagement grooves 16a and 16b of the base 16 of the hollow seal part 13 at both sides thereof, and the ridge 26 between the engagement parts 22a and 22b is fitted in the slit 17 of the base 16. That is, the ridge 26 not only simply fills the slit 17 but also holds the base 16 together with the engagement parts 22a and 22b at both sides.

In this case, the base 16 is held at two positions by the ridge 26 and the pair of engagement parts 22a and 22b. Accordingly, even if the slit 17 is wide, and in addition, even if the slit 17 is formed along the entire length of the hollow seal part 13, holding of the glass-run upper part 11 by the retainer 5 can be ensured, thereby obtaining stable holding. In addition, since the ridge 26 forms a hollow portion in a closed cross section together with the contact part 15 of the hollow seal part 13 to be in contact with the sliding window pane 1 and the base 16, the sealing ability of the hollow seal part 13 between the sliding window pane 1 and the side panel 2 can be enhanced.

In the glass-run lower part 12, the tip surface of the ridge 26 of the retainer 5 is in contact with the interior surface of the base 18 whose tip surface has an approximate U shape in cross section. Accordingly, this ridge 26 has a support function of holding the approximate U shape of the base 18 in cross section. As a result, the retainer 5 can stably hold the glass-run lower part 12.

In addition, in forming the glass run 4, the slit 17 can be made wide along the entire length of the hollow seal part 13 without impairing the holding ability of the retainer 5 to the glass-run upper part 11 and the sealing ability. As a result, the core material can be easily drawn out. In drawing out the core material, since the slit 17 is formed in the protruding portion of the base 16 of the hollow seal part 13 protruding toward the interior, the slit 17 can be easily made open outward. As a result, the core material can be more easily drawn out.

Furthermore, since the ridge 26 of the retainer 5 has an approximate T shape in cross section including the leg 26a and the jutting-out portion 26b, the weight of the retainer 5 can be more advantageously reduced, as compared to a ridge projecting from the base to a width corresponding to that of the slit 17. Moreover, since the jutting-out portion 26b of the ridge 26 is separated from the inner part 22 as the retainer body, a margin can be obtained between the base 16 and the wall surface of the inner part 22. Accordingly, even when a dimensional error occurs between the glass run 4 and the retainer 5, the jutting-out portion 26b can be easily fitted in the slit 17 of the base 16.

The ridge 26 of the retainer 5 does not need to have the above-mentioned approximate T shape in cross section, and may project from the base thereof to the same width as that of the slit 17 as described above, or may have any shape such as a trapezoid if necessary.

The ridge 26 of the retainer 5 does not need to be provided along the entire length of the slit, and may be provided only in a portion of the retainer 5 associated with an upper portion of the slit 17, or may be intermittently formed along the longitudinal direction of the slit.

The foregoing embodiment relates to a sealing mechanism of a front door of an automobile, but is applicable to a rear door.

What is claimed is:

1. A sealing mechanism for use in an automobile door including a sliding window pane configured to be raised or lowered with respect to a door window part and a side panel fixed to the door window part, the sealing mechanism comprises:

a retainer configured to be fixed to the side panel; and
a glass run held by the retainer, wherein
the glass run includes a hollow seal part comprising:
an elongate contact part having a first end, a second end, and a single and continuous intermediate portion, the intermediate portion being located between the first end and the second end such that the first and second ends are spaced apart relative to one another a distance equal to a length of the intermediate portion, the intermediate portion being further configured to be in direct contact with an interior side of the sliding window pane; and
a base connected to each of the first and the second ends of the contact part and extending away from each of the first and the second ends of the contact part, such that the base is provided at a back of the contact part,
the base of the hollow seal part has a slit extending along a longitudinal direction of the glass run,
the retainer includes a retainer body extending along a back of the base, a pair of engagement parts provided in the retainer body and engaged with a first side and a second side of the base, and a ridge projecting toward an exterior relative to the retainer body, located between the engagement parts and configured to be fitted in the slit of the base, and the intermediate portion, the base of the glass run, and the ridge of the retainer together and jointly define a hollow portion in a closed cross section of the hollow seal part extending along the longitudinal direction of the glass run.

2. The sealing mechanism of claim 1, wherein
the glass run is an integrated unit of a glass-run upper part extending upward from a position lower than a belt line of the door and a glass-run lower part extending downward from the position lower than the belt line,
the glass-run upper part includes the hollow seal part including the base having the slit,
the glass-run lower part has a channel shape,
the ridge of the retainer is provided at least in the glass-run upper part, and
in the glass-run upper part, the ridge of the retainer is fitted in the slit of the base.

3. The sealing mechanism of claim 2, wherein
the ridge of the retainer continuously extends from the glass-run upper part to the glass-run lower part,
in the glass-run upper part, the ridge of the retainer is fitted in the slit of the base, and
in the glass-run lower part, a tip surface of the ridge of the retainer is in contact with an interior surface of the glass-run lower part.

4. The sealing mechanism of claim 2, wherein
a center of the base of the glass-run upper part protrudes toward an interior relative to an interior surface of the glass-run lower part to form a protruding portion, and
the slit in which the ridge is fitted is provided in the protruding portion of the base.

5. The sealing mechanism of claim 3, wherein
a center of the base of the glass-run upper part protrudes toward an interior relative to an interior surface of the glass-run lower part to form a protruding portion, and
the slit in which the ridge is fitted is provided in the protruding portion of the base.

6. The sealing mechanism of claim 1, wherein
the ridge of the retainer has an approximate T shape in cross section including a leg projecting toward the exterior relative to the retainer body and a jutting-out portion supported by the leg and jutting out from a first side and a second side of the ridge,
the jutting-out portion comprising a first side rim and a second side rim, and
the first side rim and the second side rim of the jutting-out portion are fitted in the slit of the base.

7. The sealing mechanism of claim 2, wherein
the ridge of the retainer has an approximate T shape in cross section including a leg projecting toward the exterior relative to the retainer body and a jutting-out portion supported by the leg and jutting out from a first side and a second side of the ridge,
the jutting-out portion comprising a first side rim and a second side rim, and
the first side rim and the second side rim of the jutting-out portion are fitted in the slit of the base.

8. The sealing mechanism of claim 3, wherein
the ridge of the retainer has an approximate T shape in cross section including a leg projecting toward the exterior relative to the retainer body and a jutting-out portion supported by the leg and jutting out from a first side and a second side of the ridge,
the jutting-out portion comprising a first side rim and a second side rim, and
the first side rim and the second side rim of the jutting-out portion are fitted in the slit of the base.

9. The sealing mechanism of claim 4, wherein
the ridge of the retainer has an approximate T shape in cross section including a leg projecting toward the exterior relative to the retainer body and a jutting-out portion supported by the leg and jutting out from a first side and a second side of the ridge,
the jutting-out portion comprising a first side rim and a second side rim, and
the first side rim and the second side rim of the jutting-out portion are fitted in the slit of the base.

10. The sealing mechanism of claim 5, wherein
the ridge of the retainer has an approximate T shape in cross section including a leg projecting toward the exterior relative to the retainer body and a jutting-out portion supported by the leg and jutting out from a first side and a second side of the ridge,
the jutting-out portion comprising a first side rim and a second side rim, and
the first side rim and the second side rim of the jutting-out portion are fitted in the slit of the base.

11. A sealing mechanism comprising:
a retainer configured to be fixed to a panel; and
a glass run held by the retainer, wherein
the glass run includes a hollow seal part comprising:
an elongate contact part having a first end, a second end, and a single and continuous intermediate portion, the intermediate portion being located between the first end and the second end such that the first and second ends are spaced apart relative to one another by a length of the intermediate portion, the the intermediate portion being further configured to be in direct contact with an interior side of the sliding window pane; and
a base connected to each of the first and the second ends of the contact part and extending away from each of the first and the second ends of the contact part, such that the base is provided at a back of the contact part,
the base of the hollow seal part has a slit extending along a longitudinal direction of the glass run,
the retainer includes a retainer body extending along a back of the base, a pair of engagement parts provided in the retainer body and engaged with a first side and a second side of the base, and a ridge projecting toward an exterior relative to the retainer body, located between the engagement parts and configured to be fitted in the slit of the base,
the intermediate portion, the base of the glass run, and the ridge of the retainer together and jointly define a hollow portion in a closed cross section of the hollow seal part extending along the longitudinal direction of the glass run, and
at least a portion of the ridge of the retainer directly contacts the hollow portion.

* * * * *

UNITED STATES PATENT AND TRADEMARK OFFICE
CERTIFICATE OF CORRECTION

Page 1 of 1

PATENT NO.       : 8,832,998 B2
APPLICATION NO.  : 13/720166
DATED            : September 16, 2014
INVENTOR(S)      : Kuwabara et al.

It is certified that error appears in the above-identified patent and that said Letters Patent is hereby corrected as shown below:

In the Claims

Column 10

Line 39, "length of the intermediate portion, the the" should read
--length of the intermediate portion, the--

Signed and Sealed this

Thirteenth Day of January, 2015

Michelle K. Lee
*Deputy Director of the United States Patent and Trademark Office*